United States Patent [19]
Anderson et al.

[11] Patent Number: 6,166,661
[45] Date of Patent: Dec. 26, 2000

[54] SYSTEM FOR DETECTING ICE ON AN AIRCRAFT

[75] Inventors: Roger D. Anderson, Marengo; Mark A. Woytassek, Cedar Rapids, both of Iowa

[73] Assignee: Rockwell Collins, Inc., Cedar Rapids, Iowa

[21] Appl. No.: 09/235,542

[22] Filed: Jan. 22, 1999

[51] Int. Cl.[7] .................................................. G08B 21/00
[52] U.S. Cl. ........................................ 340/962; 244/134 R
[58] Field of Search ........................... 244/134 R, 134 F; 340/968, 962, 691; 702/172; 342/26, 59, 115

[56] References Cited

U.S. PATENT DOCUMENTS

| | | | |
|---|---|---|---|
| 3,665,466 | 5/1972 | Hibbard | 342/59 |
| 4,014,019 | 3/1977 | Fetter | 342/26 |
| 4,054,255 | 10/1977 | Magenheim | 244/134 F |
| 4,688,185 | 8/1987 | Magenheim et al. | 702/172 |
| 5,028,929 | 7/1991 | Sand et al. | 342/26 |
| 5,243,185 | 9/1993 | Blackwood | 250/225 |
| 5,484,121 | 1/1996 | Padawer et al. | 244/134 F |
| 5,488,375 | 1/1996 | Michie | 342/26 |
| 5,585,799 | 12/1996 | Yankielun et al. | 342/115 |

*Primary Examiner*—Benjamin C. Lee
*Attorney, Agent, or Firm*—Nathan O. Jensen; Kyle Eppele; J. P. O'Shaughnessy

[57] ABSTRACT

An aircraft ice detector system includes a radar system. The radar system provides a radar signal to a surface of the aircraft and determines whether ice is present based upon a reflected radar signal. The system can determine the type and the quantity of ice present based upon the reflected radar signal. The system can be mounted within a wing or on an external surface of the aircraft. The radar signal is preferably a low power signal.

5 Claims, 2 Drawing Sheets

SYSTEM FOR DETECTING ICE ON AN AIRCRAFT

FIELD OF THE INVENTION

The present invention generally relates to an ice detector. More particularly, the present invention relates to an apparatus for and a method of detecting the presence of frozen matter or ice on an aircraft surface by utilizing an electromagnetic signal.

BACKGROUND OF THE INVENTION

Weather conditions at the various altitudes associated with avionics (e.g., from ground to over 30,000 feet) can cause ice or frozen matter to form on an aircraft. Water can freeze on an external surface of the aircraft in a number of different forms, such as, frost, snow, rime, sheet ice, or other frozen build-up. The ice can adversely affect the operation, control, and aerodynamics of the aircraft. In particular, ice that accumulates on critical air surfaces, such as, the leading edges of wings, the vertical stabilizer, or the control surfaces, can adversely affect the ability of the aircraft to fly. Control surfaces can include flaps, alerons, rudders, elevators, or other sections of the airplane utilized to maneuver the airplane.

Generally, the larger the quantities of ice on the aircraft, the greater the effect on the operation of the aircraft. As noted above, ice or frozen water can accumulate on the aircraft in a variety of forms. Some forms of ice accumulate more quickly and affect the operation of the aircraft more drastically.

Accordingly, it is desirous to detect whether ice is being formed on surfaces of an aircraft. Additionally, it is desirous to detect the type (e.g., quality) of ice and the amount (e.g., thickness or quantity) of ice that is being formed on an aircraft.

Thus, there is a need for an aircraft icing detector that can detect whether ice or frozen matter is being formed on surfaces of an aircraft. Further still, there is a need for an inexpensive, small-sized ice detector that does not consume a large amount of power. Further still, there is a need for an ice detector that can detect the type of ice and quantity of ice being formed on surfaces of the aircraft.

SUMMARY OF THE INVENTION

The present invention relates to an icing detector for an aircraft. The icing detector includes an antenna attached to the aircraft and a control circuit coupled to the antenna. The control circuit provides a radar signal to the antenna and receives a reflected radar signal. The control circuit provides an indication of presence of ice in response to the reflected radar signal. The indication can be a control signal provided from the control circuit to a cockpit display.

The present invention further relates to an ice detector for determining presence of ice on a surface of an aircraft. The ice detector includes an antenna means for providing an electromagnetic signal and for receiving a reflected electromagnetic signal and a control means for generating the electromagnetic signal to the antenna and for analyzing the reflected electromagnetic signal. The control means determines the presence of ice on the surface of the aircraft.

The present invention further still relates to a method of determining presence of ice on a portion of an aircraft. The method includes providing a radar signal to the portion of the aircraft, receiving a reflected radar signal from the portion of the aircraft, and providing an indication of ice on the portion when the reflected radar signal is in a predetermined relationship with a threshold.

BRIEF DESCRIPTION OF THE DRAWINGS

Preferred exemplary embodiments of the present invention will hereafter be described with references to the accompanying drawings, wherein in like numerals denote like elements and.

DETAILED DESCRIPTION FOR THE EXEMPLARY EMBODIMENTS

Figure 1:
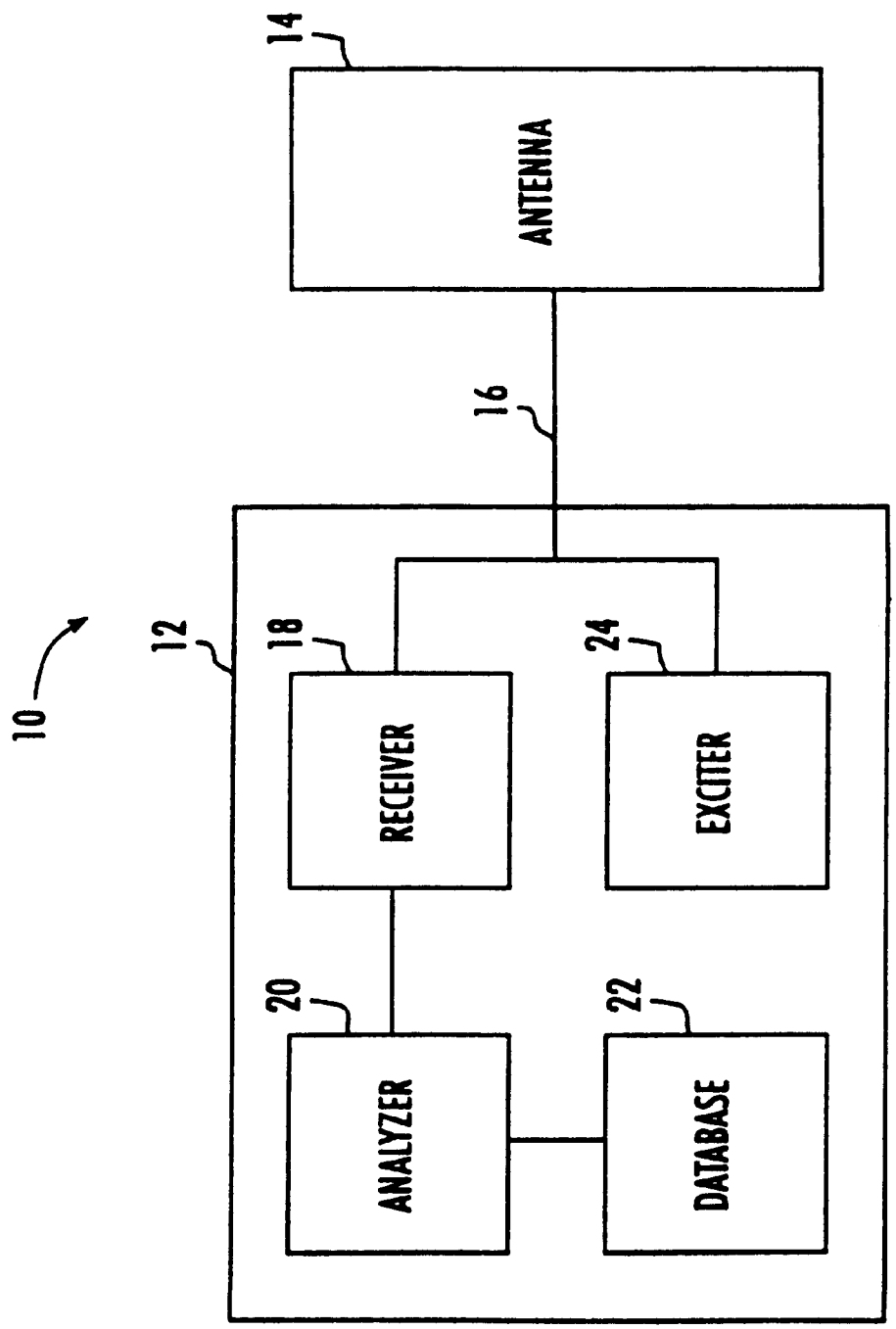
FIG. 1 is an exemplary block diagram of any ice detector system for an aircraft in accordance with an exemplary embodiment of the present invention.

With reference to FIG. 1, an ice detector system 10 includes a control circuit 12 and an antenna 14. Control circuit 12 is electrically coupled to antenna 14 by a conductor 16. Control circuit 12 can be located remotely or integrally with antenna 14. Conductor 16 can be a circuit board trace, a coaxial wire, a cable, or other conductor.

Figure 3:
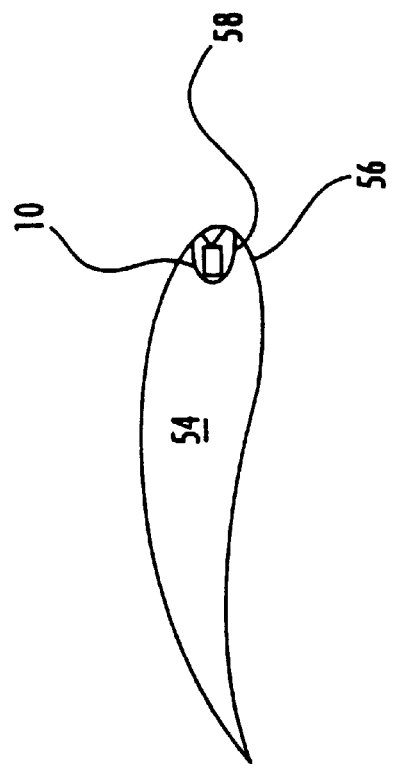
FIG. 3 is a cross sectional view of a wing of the aircraft illustrated in FIG. 2 about line 3—3, showing placement of the ice detector system illustrated in FIG. 1, in accordance with still another exemplary embodiment of the present invention.
Figure 2:
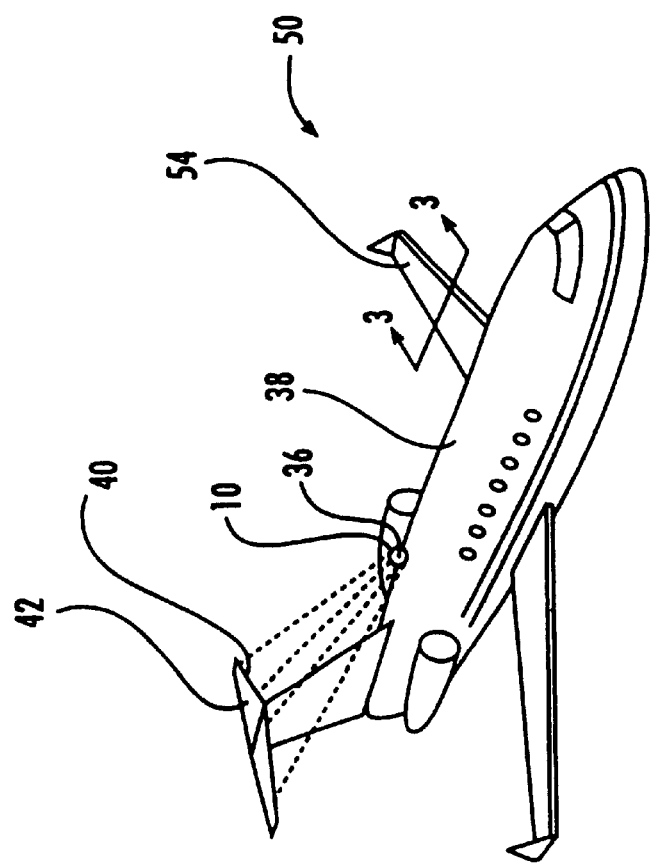
FIG. 2 is a perspective view of an aircraft including the ice detector system illustrated in FIG. 1, in accordance with another exemplary embodiment of the present invention.

Control circuit 12 includes a receiver 18, an analyzer 20, a database 22, and an exciter 24. Exciter 24 provides a radar signal across conductor 16 to antenna 14. Antenna 14 provides the radar signal through or to a surface of an aircraft (FIGS. 2 and 3). The radar signal is reflected back to antenna 14 and provided across conductor 16 to receiver 18.

Receiver 18 provides a reflected signal (e.g., a return or echo signal) to analyzer 20. Analyzer 20 compares the reflected signal to information in a database 22 and determines whether ice is present on the surface of the aircraft. Analyzer 20 preferably determines the amplitude of the return signal and compares this amplitude to known amplitudes associated with quantities and qualities of ice. Analyzer 20 can only be capable of determining whether ice is present or not and still not depart from the scope of the invention as defined in the claims. Analyzer 20 may also determine whether a certain threshold quantity of ice is present.

Database 22 can include a variety of amplitude levels or ranges associated with different types and quantities of ice, such as, sheet ice, snow, frost, or rime, at a number of different thicknesses. Alternatively, database 22 can store signatures for specific signals related to the type and quantity of ice on the aircraft.

Both the radar signal generated by exciter 24 and the return signal received by receiver 18 are preferably low power signals in the X or KU frequency band. Preferably, the radar signal has a frequency of approximately 6–7 gigahertz and has a power level in the microwatt range. Preferably, the range in distance of the radar signal is from several inches to several meters (the signal is different than conventional radar signals, such as, weather radar signals, which can reach several miles at appreciable levels). Receiver 18 and exciter 24 include mixers, filters, and other electronic components for generating and for receiving the radar and return signals, respectively.

Ice detector system 10 can be a micropower impulse radar (MIR) system that utilizes pulse-echo radar. MIR systems have been developed by Lawerence Livermore Laboratory. Alternatively, other types of electromagnetic signals can be utilized by system 10. For example, different frequency ranges can be utilized.

Control circuit 12 is preferably a CMOS device provided in a surface mount package and operating at low power, such as, at 60 microamps and 2.5 volts. Preferably, circuit 12 is implemented in an ASIC device combined with external analog components. Control circuit 12 can also be implemented in software utilizing a microprocessor and a nonvolatile memory. Control circuit 12 is preferably sized to be less than 2 square inches (e.g., one inch by one inch). System 10 can be powered by a battery or by the aircraft electrical system.

Antenna 14 can be a linear antenna, dish, horn, reflector, or other type of antenna. Antenna 14 can also include a lens or be a two-piece system with a receiving antenna and a transmitting antenna. The transmitting antenna can be remote from the receiving antenna, if necessary. System 10 is preferably disposed in a radom within or an outside surface of an aircraft. The radar and reflected signals and control circuit 12 can be relatively simple because very little power is required. Little power is required because the distance from antenna 14 to the target is short, and only slight differences in the levels of the reflected signal are necessary to determine differences in surface conditions.

The analysis and process for determining presence of ice is described below in more detail, as follows. Various characteristics can be utilized to determine whether ice is present on a surface. Generally, ice is more reflective at X and KU band radar frequencies than water. Additionally, the harder the ice (e.g., the more sheet-like as opposed to frost-like) and the larger quantity, the more reflective the ice is. Quantity and quality of ice are important to determine the effects of the airflow across a critical area of the plane or aircraft, such as, a wing.

Table I shows amplitudes in millivolts (mV) of a reflected signal on various targets at various distances in an exemplary system 10.

TABLE I

| Distances (in) | Target | Ice Present | Approximate Amplitude of Reflective Wave (mV) |
|---|---|---|---|
| 9 7/8 | Fiberglass (dry) | No | 125 |
| 9 7/8 | Fiberglass | Yes | 312 |
| 9 7/8 | Fiberglass (dry) | No | 90 |
| 9 7/8 | Fiberglass | Yes | 375 |

Distance represents the distance in inches between the target and antenna 14. Various factors affect the amplitude of the received wave or signal, including the type of ice present, the material of the target, the configuration of the antenna and target, and the distance from the antenna to the target.

As shown in Table I, there is an approximately at least a 150 mV difference between the presence of ice and the absence of ice. Analyzer 20 can utilize this difference to provide a control signal to indicate the presence of ice, the quantity of ice, and the type of ice. Analyzer 20 can provide a cockpit indication of the presence of ice through an alarm, light, or other warming element.

Table I indicates that in fiberglass targets, the amplitude of the reflected wave is less when ice is not present. Analyzer 20 can use database 22 to determine what the amplitude of the reflected signal indicates (the quality and quantity of ice). Database 22 can be filled with empirical data, predicted data, or experimental data.

With reference to FIG. 2, system 10 is disposed on an external surface 38 of an aircraft 50. Aircraft 50 can be any type of non-earth driven vehicle. Aircraft 50 can be any type of aircraft, such as, a commercial airliner, a private airplane, a helicopter, a rocket, or other flying vehicle. System 10 includes antenna 14 (FIG. 1) disposed in a small radome 36. Preferably, antenna 14 of system 10 is within several meters of a leading edge 40 of stabilizer 42. Control circuit 12 of system 10 can be located on external surface 38 in small radome 36. However, control circuit 12 can be provided within aircraft 50, including within the cockpit of aircraft 50.

System 10 can be disposed anywhere on surface 38 to determine if ice is on any particular surface of aircraft 50. Preferably, a number of systems 10 are disposed throughout surface 38 to check all critical surfaces of aircraft 50. System 10 in FIG. 2 preferably provides a narrow beam to leading edge 40 of stabilizer 42. Alternatively, antenna 14 (FIG. 1) can include a receiving antenna located at a first location and a transmitting antenna located at a second location. The critical or monitored surface is between the first and second location.

With reference to FIG. 3, system 10 is disposed within a wing 54 of aircraft 50. Preferably, several systems 10 are disposed along a leading edge 56 of wing 54 in a radome 58. When system 10 is placed within wing 54, leading edge 56 remains conventional (e.g., there is no hole in leading edge 56 of wing 54). Radome 58 can be fiberglass provided within the outer metal skin of wing 54. System 10 is within the body of wing 54 and provides a radar signal via antenna 14 through radome 58. As ice forms on the outside of radome 58 (e.g., leading edge 56), the radar signal is greatly attenuated and reflected back to antenna 14 (e.g., a return signal). The greater the amount of ice that is present, the more attenuation (e.g., the more reflection) occurs.

It is understood that while the detail drawings, specific examples, and particular values given provide preferred exemplary embodiments of the present invention, the preferred exemplary embodiments are for the purpose of illustration only. The method and apparatus of the invention are not limited to the precise details and conditions disclosed. For example, although particular MIR radar signals are described, other types of electromagnetic radar can be utilized. Various changes may be made to the detail disclosed, without departing from the spirit of the invention, which is defined by the following claims.

What is claimed is:

1. An icing detector for an aircraft, comprising:
   an antenna attached to the aircraft; and
   a control circuit coupled to the antenna, the control circuit providing a radar signal to the antenna and receiving a reflected radar signal, the control circuit providing an indication of presence of ice in response to the reflected radar signal;
   wherein the antenna provides the radar signal through a radome in the wing.

2. The detector of claim 1, wherein the reflected signal is greater when ice forms on the radome.

3. A method of determining a presence of ice on a portion of an aircraft, the method comprising:
   providing a radar signal to the portion of the aircraft;
   receiving a reflected radar signal from the portion of the aircraft, and providing an indication of ice on the portion when the reflected radar signal is in a predetermined relationship with a threshold;

wherein the predetermined relationship exceeds the threshold.

4. The method of claim 3, wherein the radar signal is provided through a radome.

5. The method of claim 4, wherein the radome is disposed in a leading edge of a wing of the aircraft.

* * * * *